C. H. HOWARD & H. M. PFLAGER.
TRUCK CONSTRUCTION.
APPLICATION FILED NOV. 25, 1912.
1,080,557.
Patented Dec. 9, 1913.
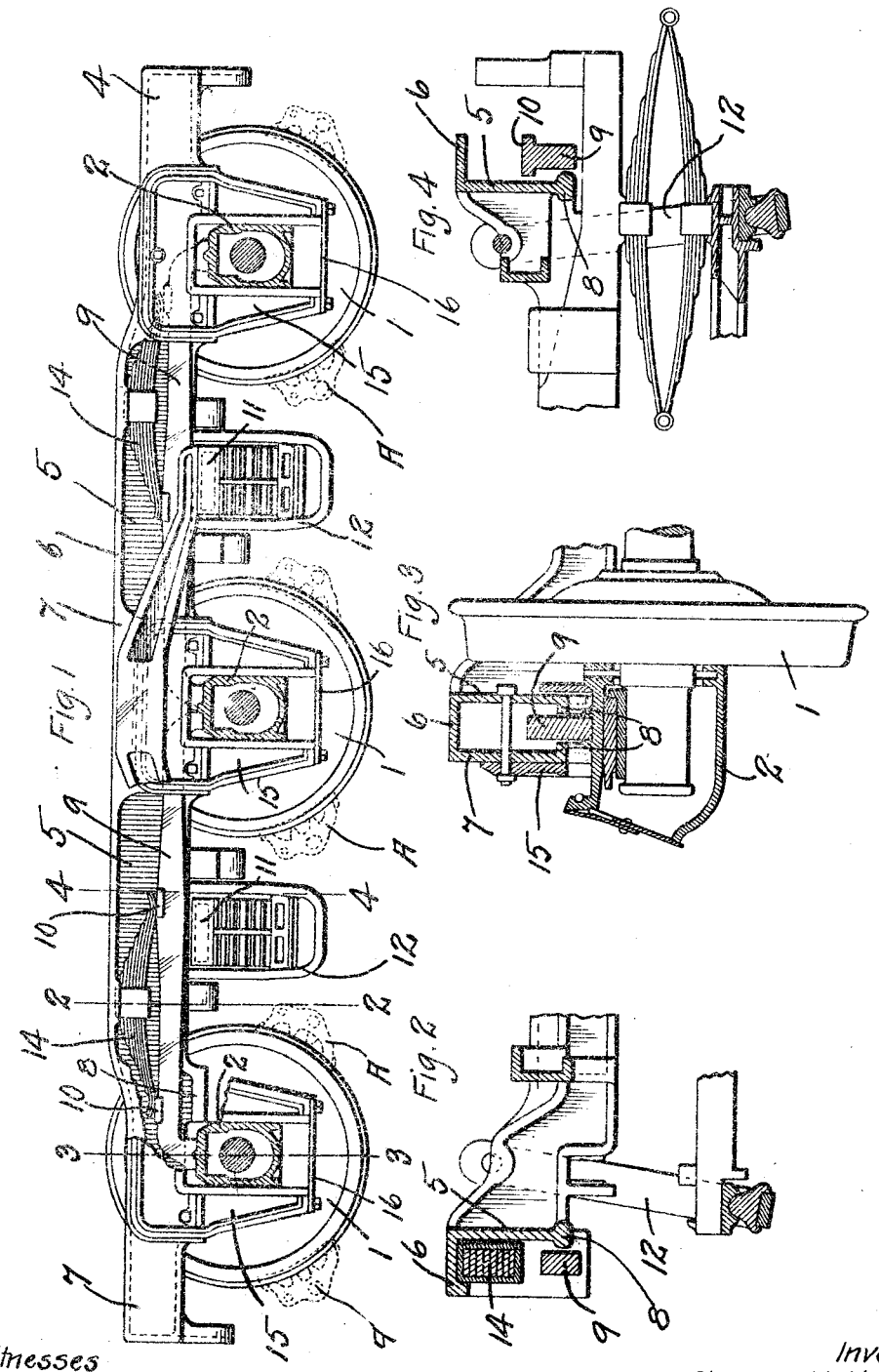
Witnesses
Inventors
Clarence H. Howard
Harry M. Pflager
BY F. R. Cornwall Atty.

UNITED STATES PATENT OFFICE.

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

TRUCK CONSTRUCTION.

1,080,557.    Specification of Letters Patent.    Patented Dec. 9, 1913.

Application filed November 25, 1912. Serial No. 733,414.

*To all whom it may concern:*

Be it known that we, CLARENCE H. HOWARD and HARRY M. PFLAGER, citizens of the United States, residing at St. Louis, Missouri, have invented a certain new and useful Improvement in Truck Construction, of which the following is a full, clear, and exact description, such as will enable others skilled in the art to which it appertains to make and use the same, reference being had to the accompanying drawings, forming part of this specification, in which—

Figure 1 is a side view of a six-wheel truck partly in section illustrating our improved construction. Fig. 2 is a section on line 2—2 of Fig. 1. Fig. 3 is a section on line 3—3 of Fig. 1. Fig. 4 is a section on line 4—4 of Fig. 1.

Our invention relates broadly to railway car truck construction, and specifically to a novel and useful arrangement and construction of the truck frame wheel pieces and the equalizing members of said truck.

In the construction of trucks now in general use, the equalizing bars which carry the springs upon which the truck frame and car body are supported, are carried upon the journal boxes and have portions depending between the wheels. The disposal of these parts in the present forms of trucks is such that portions of the truck equipment, principally the brakes and brake heads, are to a large extent covered up so that inspection thereof is inconvenient and repair difficult.

The principal object of our invention is to produce a car truck having a truck frame wherein the wheel or side pieces are formed so as to give maximum space for the equalizing members, said equalizing members being arranged and associated with the truck frame so that they will not interfere with the free inspection and repair of the various portions of the truck equipment such as brakes, and where said equalizing members are arranged so that they will be effectually protected from injury and held against falling on to the truck in case they become broken.

Still further objects of our invention are to provide a truck construction wherein the equalizing members are particularly designed to increase the flexibility and easy riding qualities of the truck and to produce thereby, by virtue of the disposal of the equalizing members within portions of the truck frame, preferably the wheel pieces, a lighter and more compact construction than has heretofore been possible.

Our present application should be read in connection with an application on a similar structure filed by us November 18th, 1912, Serial No. 732,099.

Other and further objects of our invention will be apparent from the following description of the device shown in the drawings, wherein we have illustrated the specific application of our invention.

In the drawings a six-wheel truck is shown wherein the wheels 1 are mounted upon the usual axles and the ends of the latter are arranged in the usual manner in journal boxes 2. A truck frame is formed with the usual side members or wheel pieces 4 which are substantially channel shape in cross section, each comprising a vertically disposed wall 5, a top wall or plate 6, and an outer wall 7. The lower edge of the vertical wall or web 5 is reinforced by suitable ribs or flanges, as designated by 8 (see Figs. 2 and 4). Those portions of the wheel pieces above and adjacent to the journal boxes are substantially of inverted U-shape in cross section as shown in Fig. 3, and those portions of the wheel pieces over the bolsters and between the parts to which the pedestals are attached are substantially channel shape or of inverted L-shape, as clearly shown in Figs. 2 and 4.

The equalizing bars 9 are formed substantially straight and have their ends extended downwardly to form feet which are adapted to rest upon the journal boxes. On the upper sides of the equalizing bars are formed seats 10 for the springs. The truck bolsters 11 are supported in a well known fashion between the wheels, being carried upon the hangers 12. The equalizing bars 9 are positioned substantially within the hollow or channel shaped wheel pieces 4 with their ends resting upon the journal boxes 2. Elliptical springs 14 are carried upon the seats 10 of the equalizing bars and these springs support the truck frame 4. Fixed to the wheel pieces in any suitable manner are the upper portions of pedestals 15, the jaws of which project downward to the sides of the journal boxes in the usual manner. The lower ends of the pedestal jaws are united by tie straps 16. From this description, it will be seen that the weight of the truck frame and car is carried by the equalizing bars which are supported on the journal boxes, the springs 14 forming a flexible support between the equalizing bars and the truck frame. By virtue of this construction, the weight upon the truck is distributed equally to all of the wheels, the flexible support 14 operating to maintain constantly this equal distribution of weight among the wheels irrespective of changes of elevation of any of the wheels relative to others.

By virtue of the construction described, it will be seen that it is possible to make the equalizing bars much lighter than in constructions now in use. It will be noted also that the equalizing members are positioned high above the track and above the truck bolster and the journal boxes, and that they are entirely removed from in front of the brake beams illustrated at "A," so that the latter are readily accessible for inspection or repairs.

The use of half-elliptic springs provides not only a more flexible support than coiled springs, now commonly used in truck construction, but also provides a much stronger and more substantial support due to the spacing apart of the bearing points of the end portions of said springs. By such arrangement, greater flexibility is produced and the springs more readily absorb stresses, thereby materially reducing vibration and jolting of the truck frame during the movement of the truck upon the rails.

We are aware that the principle of our invention may be applied in constructions considerably at variance with the single specific embodiment hereinbefore described, and therefore, we do not intend that the construction to be placed upon the following claims shall be such as to limit our invention in scope to the particular form illustrated; but we do intend that our invention shall be so construed as to cover all obvious modifications and applications of the principles involved.

We claim:

1. In a truck construction, a series of wheel carrying axles, journal boxes therefor, an equalizer bar supported upon an adjacent pair of journal boxes and lying in a plane wholly above said boxes, a flat flexible member supported by the equalizer bar, and a truck frame supported upon said member, the wheel piece of which truck frame is hollow and contains said equalizer bar and flexible member.

2. In a truck construction, the combination with a series of wheel carrying axles and journal boxes, of equalizer bars supported by the journal boxes, flat flexible equalizing members supported by said equalizer bars, and a truck frame supported by said flat equalizing members, which truck frame is provided with hollow wheel pieces which contain the equalizer bars and equalizing members.

3. In a truck construction, the combination with a series of wheel carrying axles and journal boxes, of equalizer bars supported by the journal boxes, equalizer springs supported by said equalizer bars, and a truck frame supported by said equalizer springs and having substantially hollow wheel pieces, which equalizer bars and equalizer springs are contained within said hollow wheel pieces and arranged above the journal boxes and below the top of the truck frame.

4. In a truck construction, the combination with a series of wheel carrying axles and journal boxes, of rigid equalizer bars supported by the journal boxes, an equalizer spring mounted on each equalizer bar, and a truck frame having substantially hollow wheel pieces in which the equalizer bars and springs are located.

5. In truck construction, the combination with a series of wheel carrying axles and journal boxes, of rigid equalizer bars supported by the journal boxes, an equalizer spring mounted on each equalizer bar, and a truck frame the wheel pieces of which are provided with flanges which inclose the equalizer bars and springs.

6. In a truck construction, the combination with a series of wheel carrying axles, of an equalizer bar supported at its extremities upon an adjacent pair of journal boxes, a truck frame, and a half elliptic spring mounted on the equalizer bar and supporting the truck frame.

7. In a truck construction, a series of wheel carrying axles, journal boxes therefor, an equalizing bar supported at its extremities upon an adjacent pair of journal boxes, spring seats on said equalizer bar, a half elliptic spring mounted on said spring seats, and a truck frame supported by said spring.

8. In a six-wheel truck, the combination with a series of wheel carrying axles, journal boxes therefor, equalizing bars disposed in series with their extremities resting upon the journal boxes, a half elliptic spring carried by each equalizing bar, and a truck frame supported on said springs.

9. In a truck construction, the combination with a series of wheel carrying axles and journal boxes, of a truck frame having substantially channeled wheel pieces, and an equalizing bar supported at its extremities by an adjacent pair of said journal boxes, which equalizer bar is disposed within the channeled portion of said wheel piece.

10. In a truck construction, a series of wheel carrying axles, journal boxes therefor, a truck frame having substantially hollow wheel pieces, equalizing bars supported at their extremities on certain of said journal boxes, and springs supported on said equalizing bars and in turn supporting said truck frame, said springs and said equalizing bars being disposed within the substantially hollow wheel pieces of the truck.

11. In a truck construction, a truck frame having its wheel pieces cast in the form of housings, a series of wheel carrying axles equipped with journal boxes, a series of equalizing bars supported at their extremities upon certain of said journal boxes, and flexible mountings for said truck frame supported on said equalizing bars, said equalizing bars and said flexible mountings being contained within the housings formed by the wheel pieces of the truck.

12. In a car truck, a truck frame having a wheel piece, portions of which are substantially box shaped in cross section and portions of which are substantially of inverted L-shape in cross section, and a rigid equalizing member and a flexible equalizing member located within said wheel piece.

In testimony whereof we hereunto affix our signatures in the presence of two witnesses, this 19th day of November, 1912.

CLARENCE H. HOWARD.
HARRY M. PFLAGER.

Witnesses:
CHAS. S. SHALLENBERGER,
HAL C. BELLVILLE.